Patented May 11, 1943

2,319,043

UNITED STATES PATENT OFFICE 2,319,043

ANTHRAQUINONE COMPOUNDS AND CELLULOSE DERIVATIVES COLORED THEREWITH

Joseph B. Dickey and James G. McNally, Rochester, N. Y., assignors to Eastman Kodak Company, Rochester, N. Y., a corporation of New Jersey No Drawing. Application February 23, 1940, Serial No. 321,336

1 Claim. (Cl. 260—376)

The present invention relates to anthraquinone compounds and to materials colored therewith. More particularly, it relates to anthraquinone compounds containing in at least one alpha position the group having the general formula:

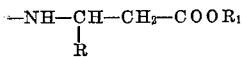

wherein R represents a member selected from the group consisting of hydrogen, a methyl group, an ethyl group, and a propyl group, and $R_1$ represents a member selected from the group consisting of an alkyl group, a hydroxyalkyl group, and an alkoxyalkyl group. More specifically, $R_1$ may be a methyl group, an ethyl group, a propyl group, a butyl group, a cetyl group, a hydroxyethyl group, a β-hydroxypropyl group, a γ-hydroxypropyl group, an ω-hydroxybutyl group, a glyceryl group, a methoxymethyl group, a methoxyethyl group, a methoxybutyl group, an ethoxyethyl group, an acetoxyethyl group, a propionyloxyethyl group, a butyryloxyethyl group, and similar kind of alkyl and substituted alkyl groups. The anthraquinone nucleus may be further substituted in any alpha position not already occupied by a member of the group of β-aminocarboxylic acid esters represented by the above formula, with one or more members selected from the group including a hydroxyl group, an amino group, a methyl-, ethyl-, propyl-, butyl-, or cetylamino group, a hydroxyethyl-, β-hydroxylpropyl-, γ-hydroxypropyl-, or glyceryl-amino group, a β-methoxethyl-, β-ethoxyethyl-, β-butoxyethyl-, or γ-methoxypropyl-amino group, an allylamino group, a cyclohexylamino group, a cyclopentylamino group, a tetrahydrofurfurylamino group, a furfurylamino group, a benzylamino group, a β-phenylethylamino group, a phenylamino group, and other similar kind of monovalent radicals.

We have found that the anthraquinone compounds of our invention, in addition to being valuable dyestuff intermediates, are in themselves excellent dyes for coloring organic derivatives of cellulose, particularly cellulose acetate. Furthermore, they show a greater affinity for organic derivatives of cellulose and a lesser affinity for materials such as silk or wool, than do the corresponding free acids and their salts, and analogous anthraquinone compounds employed heretofore. Materials such as cellulose acetate are colored by our dyes greenish-blue to violet shades and display an excellent stability to light and atmospheric exposure. It is an object of our invention, therefore, to prepare the compounds described in the foregoing and to color organic derivatives of cellulose therewith.

The anthraquinone compounds of the invention may be prepared by refluxing in a medium consisting of an aliphatic alcohol, pyridine or dimethylaniline, a mixture comprising an aliphatic ester of a β-aminocarboxylic acid and an anthraquinone compound having one or more of its alpha positions substituted by a group or atom capable of being replaced, such as an amino group, a hydroxyl group, an alkoxy group, or a halogen atom. The necessary β-aminocarboxylic acid aliphatic ester intermediates may be prepared by a number of methods, but particularly by the method of Jean Decombe, Annales De Chimie, 18, 79–187 (1932), wherein the acetyl hydrazones of carboxylic acid esters are prepared and then reduced by aluminium amalgam to the corresponding β-aminocarboxylic acid esters.

The invention is illustrated further by the following examples.

*Example 1*

A mixture of equal molecular proportions of leucoquinizarin and ethyl-β-aminobutyrate in 3000 c. c of methanol is heated to boiling for a period of 6 hours. The reaction mixture is then poured into water, oxidized with sodium perborate, and the precipitated dye filtered off, washed and dried. The dye thus obtained has the formula:

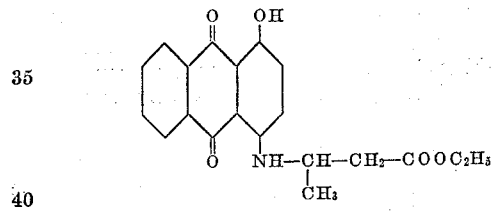

and colors cellulose acetate purple shades from an aqueous suspension of the dye. If 2 moles of ethyl-β-aminobutyrate is used, there is obtained the corresponding di-substituted anthraquinone. In place of leucoquinizarin, there may be substituted leuco- 1,4,5-trihydroxy anthraquinone, and leuco-1,4,5,8-tetrahydroxy anthraquinone, and in place of ethyl-β-aminobutyrate there may be substituted methyl-β-aminobutyrate, butyl-β-aminobutyrate, methyl-β-aminovalerate, propyl-β-aminocaproate, and methyl, ethyl, propyl, butyl, and cetyl esters of β-aminopropionic acid. All of the above dyes produce purplish shades on cellulose acetate.

Example 2

A mixture of equal molecular proportions of leucoquinizarin, ethanolamine, and methyl-β-amino butyrate in 1500 c. c. of butanol is heated under reflux until no further color change takes place. The dye is then precipitated, oxidized, and recovered as described in Example 1. The dye compound thus obtained has the formula:

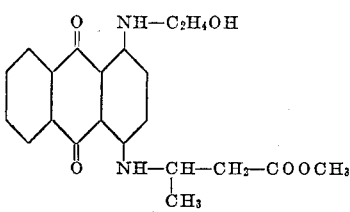

and colors cellulose acetate blue shades from an aqueous suspension of the dye. In place of ethanolamine, there may be substituted methylamine, ethylamine, propylamine, cetylamine, propanolamine, butanolamine, allylamine, tetrahydrofurfurylamine, methyl ester of β-aminopropionic acid, β'-methoxyethyl ester of β-aminopropionic acid, β'-acetoxyethyl ester of β-aminopropionic acid, 1-amino-2-methoxyethane, 1-amino-2-ethoxyethane, cyclohexylamine, 2-aminothiazole, aniline, benzylamine, para-phenylene diamine, and similar kind of organic amines. The methyl-β-aminobutyrate may be replaced by the ethyl-, propyl-, butyl-, β'-hydroxyethyl-, β'-methoxyethyl-, β'-ethoxyethyl-, or β'-acetoxyethyl esters of β-amino butyric acid, β-aminovaleric acid, and β-aminocaproic acid. Similar dyestuffs are obtained by substituting the leucoquinizarin by leuco-1,4,5-trihydroxyanthraquinone, leuco-1,4,5,8-tetrahydroxyanthraquinone, leuco-1,4-diamino anthraquinone, and leuco-1,4,5,8-tetramino anthraquinone. In general, the dyes produced by condensing the above amines with leucoquinizarin or leuco-1,4-diaminoanthraquinone color cellulose acetate blue shades, while those produced with leuco-1,4,5,8-tetrahydroxyanthraquinone or leuco-1,4,5,8-tetraaminoanthraquinone color cellulose acetate greenish-blue shades.

Example 3

A mixture of equal molecular proportions of leuco-1,4,5-triamino anthraquinone, ethyl-β-aminopropionate and propanolamine is heated under reflux in butanol until no further color change takes place, and dye recovered as described in Example 1. Cellulose acetate is colored greenish-blue shades from an aqueous suspension of the dye. The compound has the formula:

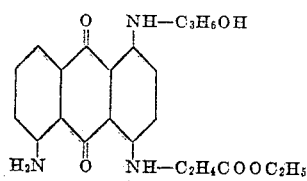

Instead of leuco-1,4,5-triamino anthraquinone, there may be employed leuco-1,4-diamino anthraquinone which colors cellulose acetate blue shades, leuco-1,4,5,8-tetraamino anthraquinone which colors cellulose acetate greenish-blue shades, leuco-1,4-diamino-5-methylamino-8-phenylamino anthraquinone which colors cellulose acetate greenish-blue shades, and leuco-1,4-dihydroxy-5-phenylamino-8-ethylamino anthraquinone which colors cellulose acetate greenish-blue shades.

Example 4

A mixture of equal molecular proportions of leuco-1-hydroxy-4-aminoanthraquinone, cyclohexylamine, and ethyl-β-aminobutyrate in propanol is heated under reflux for a period of about 6 hours. The reaction mixture is then poured into water, oxidized with sodium perborate, and the precipitated dye filtered off, washed and dried. The dye compound thus obtained has the formula:

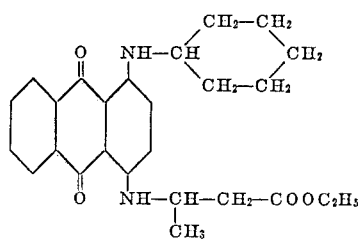

and colors cellulose acetate blue shades from its aqueous suspensions.

Example 5

1 mole of leucoquinizarin is heated under reflux with 1 mole of aniline and 1 mole of ethyl-β-aminobutyrate in 3000 c. cs. of pyridine until no further color change takes place. The reaction mixture is oxidized with air, and the dye crystallized by evaporation of the pyridine. The compound thus obtained has the formula:

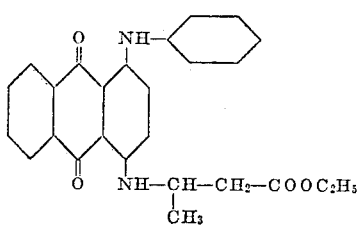

and colors cellulose acetate blue shades from its aqueous suspensions. In place of leuco-1,4-diaminoanthraquinone, there may be substituted leuco-1,4,5-triamino anthraquinone, and leuco-1,4,5,8-tetraamino anthraquinone both of which color cellulose acetate greenish-blue shades.

Example 6

A mixture of 1 mole each of 1-methylamino-4-bromoanthraquinone and ethyl-β-aminobutyrate is dissolved in 500 c.c. of dimethylaniline and heated under reflux for 24 hours or until no further color change takes place toward the blue. The reaction may be catalyzed with copper powder, copper acetate, and other copper salts. The dye obtained by crystallization from concentrated and cooled solution colors cellulose acetate blue shades from an aqueous suspension of the dye which has the following formula:

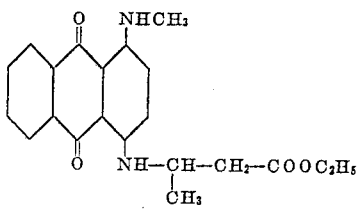

In place of 1-methylamino-4-bromoanthraquinone there may be substituted 1-ethylamino-, 1-propylamino-, 1-ethanolamino-, 1-cyclohexylamino-, 1-anilino-, or 1-benzylamino-4-bromoanthraquinone. All of the anthraquinone dyes prepared as described in this example color cellulose acetate blue shades.

Example 7

1 mole of 1-amino-4-methoxy anthraquinone is dissolved in 5000 c.c. of methanol, the solution heated to boiling, and 1 mole of ethyl-β-aminobutyrate added slowly with stirring. When no further color change takes place, a portion of the alcohol is distilled off and the dye allowed to crystallize from the concentrate. The compound thus obtained has the formula:

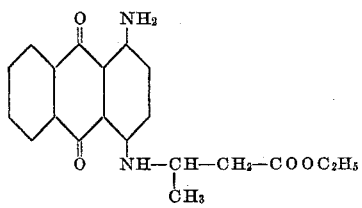

and colors cellulose acetate purplish-blue shades from an aqueous solution of the dye.

Example 8

1 mole of leuco-1,4-diamino anthraquinone is heated under reflux with 2–3 moles of the β-hydroxyethyl ester of normal β-amino butyric acid in 3000 c.c. of pyridine until no further color change takes place. The solution is then oxidized with air, concentrated by evaporation, and the dye recovered as crystals. The dye product has the formula:

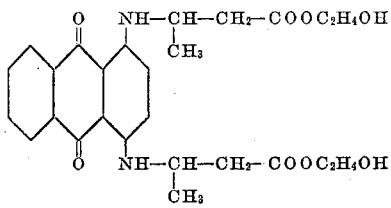

and colors cellulose acetate blue shades from an aqueous solution of the dye. In place of leuco-1,4-diamino anthraquinone, there may be substituted leuco-1,4,5-triaminoanthraquinone, and leuco- 1,4,5,8-tetraaminoanthraquinone both of which color cellulose acetate greenish-blue shades.

In the application of the anthraquinone compounds of our invention to the coloration of cellulose acetate, the dye will ordinarily be applied from an aqueous suspension which may be prepared by grinding the dye to a paste with a dispersing agent such as a soap, a sulfonated oil, or a fatty acid glycerol sulfate, and dispersing the paste in water. The material to be colored is then immersed in the dispersion starting with a temperature of about 45–55° C., which is gradually raised to 80–85° C., at which point the material is worked for several hours. Salt may be added to facilitate exhaustion of the dye bath during the dyeing operation.

While our invention is illustrated more particularly in connection with cellulose acetate, it will be understood that the anthraquinone compounds above described are by no means limited to cellulose acetate alone, but are likewise applicable to other organic derivatives of cellulose such as hydrolyzed and unhydrolyzed organic acid esters of cellulose or mixed organic acid esters of cellulose including cellulose formate, cellulose propionate, cellulose butyrate, cellulose acetate-propionate, cellulose acetate-butyrate, and cellulose ethers including methyl cellulose, ethyl cellulose, and benzyl cellulose. Further, the dye compounds of the invention are also applicable to materials comprising a mixture of one or more of the above mentioned organic derivatives of cellulose, as well as to materials comprising an organic derivative of cellulose admixed or interwoven with other textile materials.

We claim:

The anthraquinone compound having the formula:

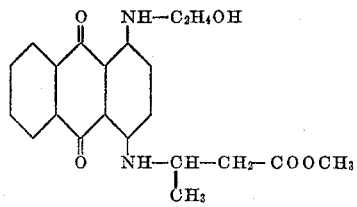

JOSEPH B. DICKEY.
JAMES G. McNALLY.